No. 639,237. Patented Dec. 19, 1899.
F. C. HIRSCH.
MOTOR CARRIAGE.
(Application filed Apr. 13, 1899.)
(No Model.) 7 Sheets—Sheet 2.

Witnesses:
D. W. Gardner.
Belle Kavanaugh.

Inventor:
Feodor C. Hirsch
By his Attorney
George William Elliott

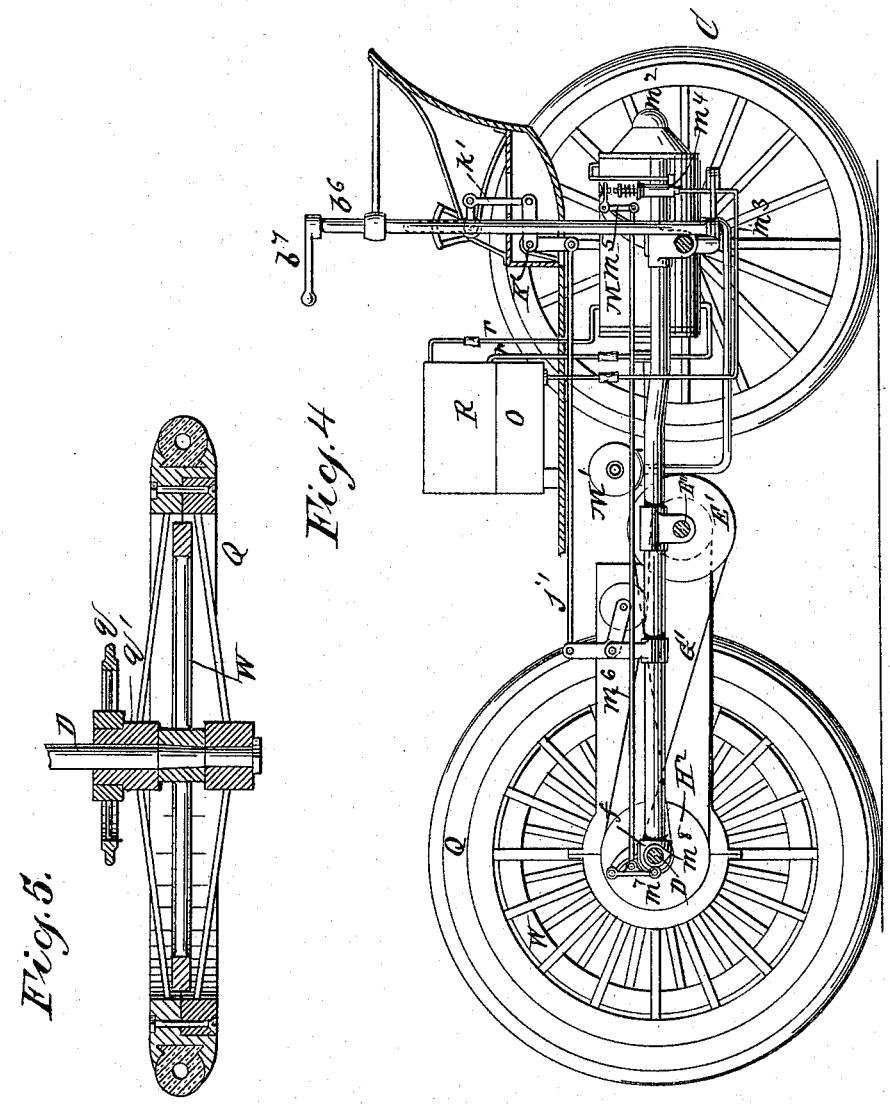

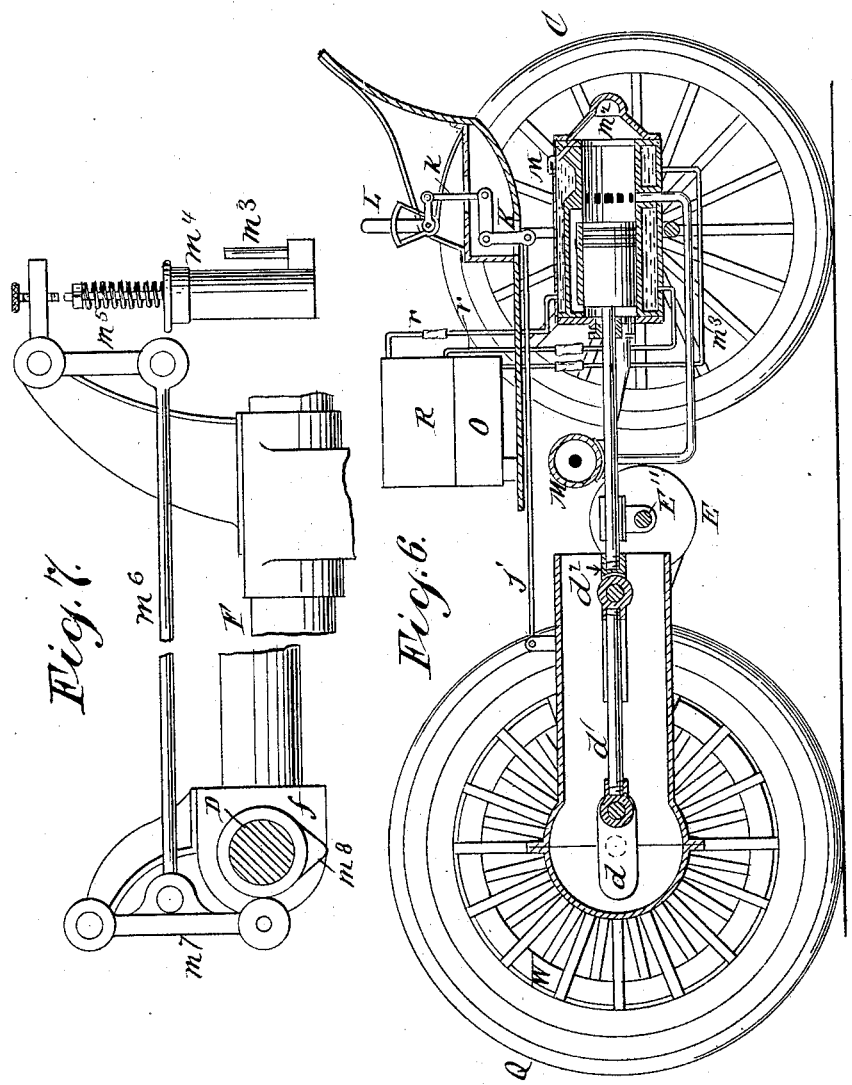

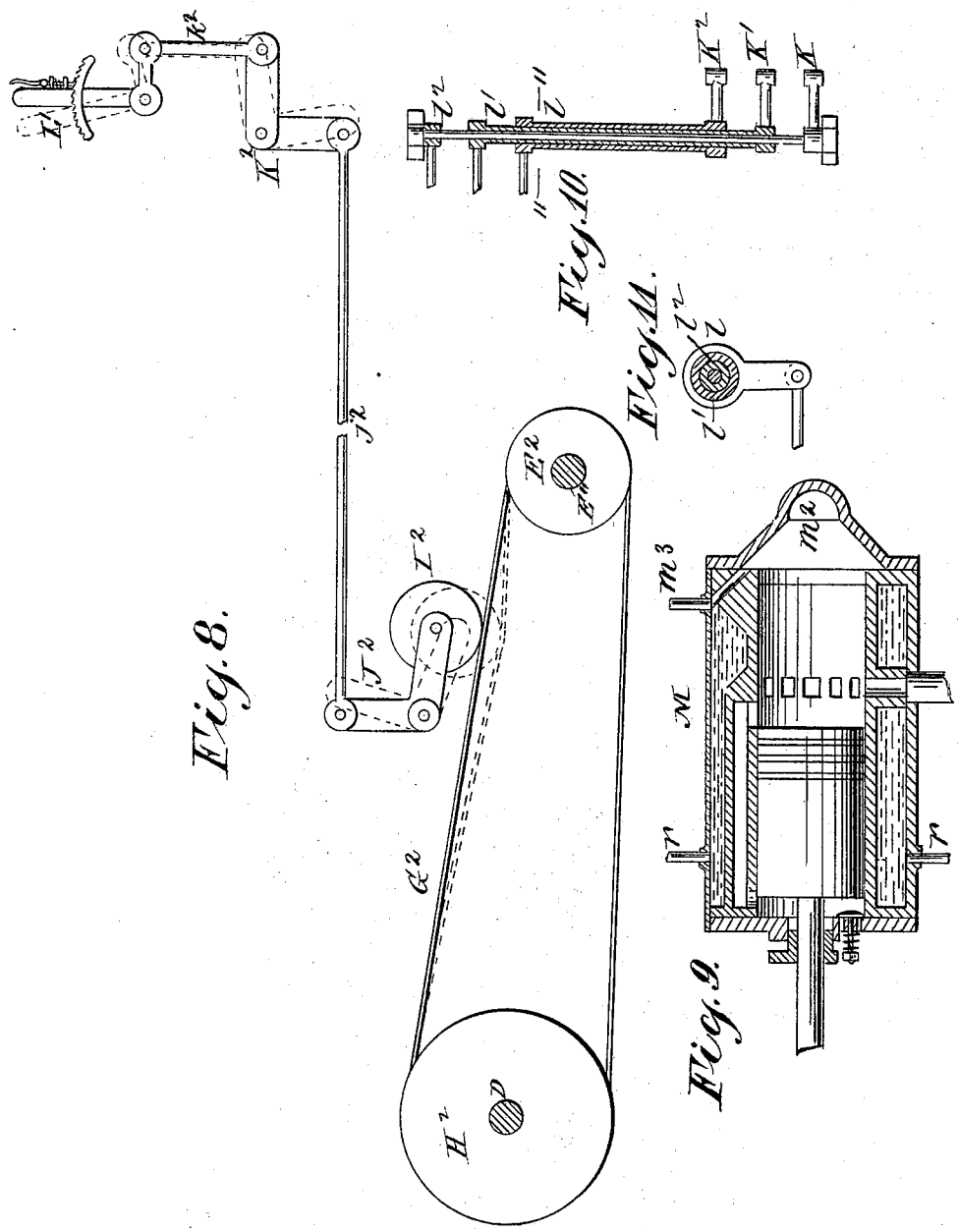

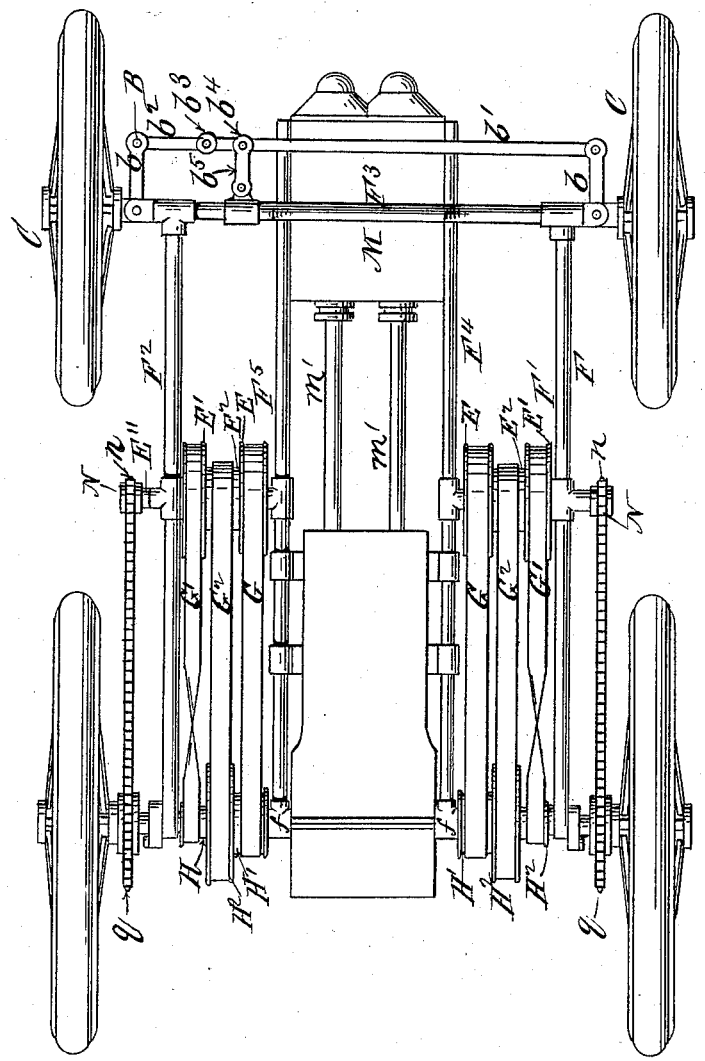

UNITED STATES PATENT OFFICE.

FEODOR C. HIRSCH, OF NEW YORK, N. Y., ASSIGNOR TO JAMES W. EATON, TRUSTEE, OF ISLIP, NEW YORK.

MOTOR-CARRIAGE.

SPECIFICATION forming part of Letters Patent No. 639,237, dated December 19, 1899.

Application filed April 13, 1899. Serial No. 712,864. (No model.)

*To all whom it may concern:*

Be it known that I, FEODOR C. HIRSCH, a citizen of the United States residing in the city, county, and State of New York, have invented certain new and useful Improvements in Motor-Carriages, of which the following is a specification sufficient to enable others skilled in the art to which the invention appertains to make and use the same.

My invention relates to kerosene-oil motor-carriages; and it consists in the special construction and arrangement of parts hereinafter described and claimed for operating and controlling the speed of the vehicle.

Figure 1:
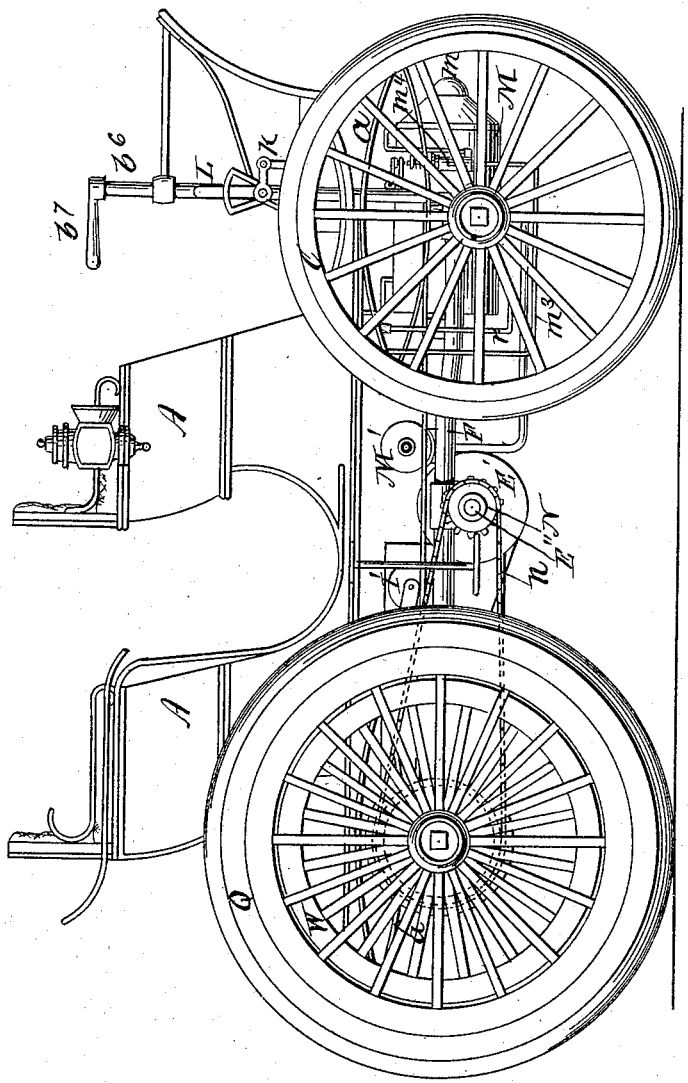
Figure 2:
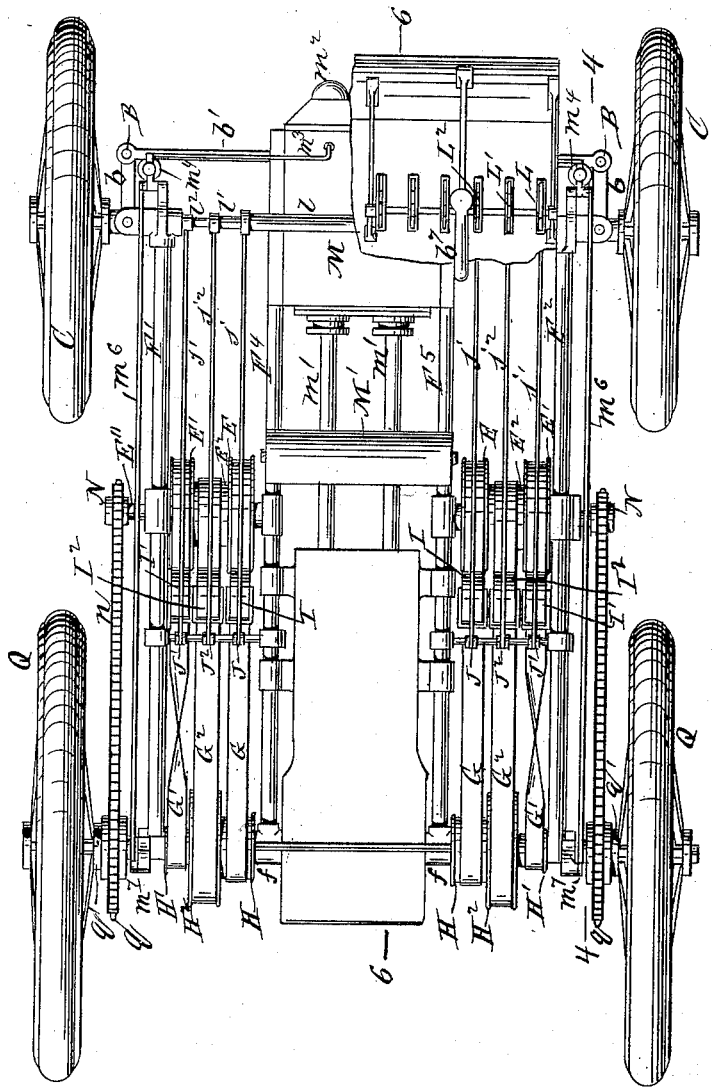
Figure 8:
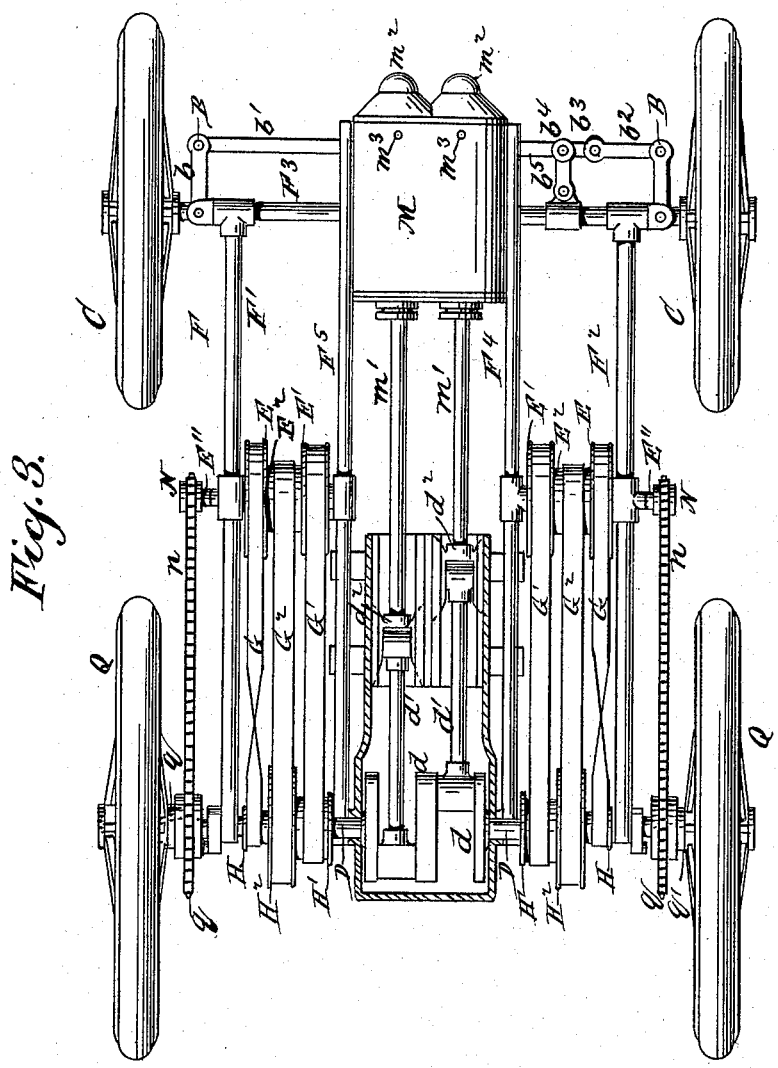

In the accompanying drawings, Figure 1 is a side elevation of my improved carriage. Fig. 2 is a plan, the greater portion of the body being removed. Fig. 3 is a similar view, partly in section. Fig. 4 is a vertical section on plane of line 4 4, Fig. 2. Fig. 5 is a horizontal section through one of the driving-wheels. Fig. 6 is a section on plane of line 6 6, Fig. 2. Fig. 7 is an enlarged view in detail of the pump feeding mechanism. Fig. 8 is a detail view of one of the belt-tightening pulleys, illustrating the operation of the action of the driving-pulleys. Fig. 9 is a sectional detail of one of the cylinders. Fig. 10 is a horizontal section through the medium of which the crank-sleeves operate upon the driving-belts. Fig. 11 is an enlarged sectional detail upon plane of line 11, Fig. 10; Fig. 12, a view of the under side of my carriage.

A represents the body of the carriage resting on springs $a$, supported in turn by the frame F. The frame F consists of two outer longitudinal members $F'$ $F^2$, the front cross-bar $F^3$, and the inner longitudinal members $F^4$ $F^5$, all the longitudinal members being secured rigidly to the cross-bar $F^3$ in front and clasping the driving-axle D at the rear, as by means of the bearings $f$.

Pivoted to the outer ends of the cross-bar $F^3$ are bell-crank levers B, one arm of which forms a journal for one of the front wheels C, while the other arms $b$ are connected by rods $b'$ $b^2$, so that the wheels may be turned in unison. The rods $b'$ $b^2$ are pivotally connected to each other at $b^3$, and the rod $b'$ is pivotally connected at $b^4$ to a crank-arm $b^5$, operated through the medium of the vertical rod $b^6$ and crank-lever $b^7$. Thus by means of the handle $b^7$ the two front wheels C C may be simultaneously turned in parallel lines in either direction.

M is a double-cylinder motor supported upon the forward portion of the frame, the power-shaft in this case being the rear axle D of the vehicle, the opposed cranks $d$ $d$ being interposed centrally between the outer portions of the axle and being connected directly by the pitman-rods $d'$ $d'$ to the reciprocating cross-heads $d^2$ $d^2$, which in turn are connected directly to the outer ends of the piston-rods $m'$ $m'$. The cylinders M M are formed, preferably, in a single casting, their outer or front ends being closed by a cap formed with ignition-chambers $m^2$, one for each cylinder. Into these ignition-chambers $m^2$ oil is injected through the pipes $m^3$ from the pump $m^4$. The pumps are operated through the medium of the bell-crank levers $m^5$, connection-rods $m^6$, and cam-levers $m^7$ by the cams $m^8$ upon the power or driving shaft D.

It is obvious that any suitable type of motor M may be employed, and the one shown herein, although a preferred form, is not absolutely essential to the carrying out of my invention in other details, a suitable motor being simply an element in the combination and arrangement of parts as a whole. Where a kerosene-motor is used, as indicated, it is kept cool by a circulation of water or other fluid through the reservoir R, pipes $r$, and jackets surrounding the cylinder.

O is the oil-tank supplying oil to the pumps $m^4$. The exhaust-pipe from the cylinders enters a muffler $M'$.

Extending between the members $F'$ and $F^4$ and $F^2$ and $F^5$ of the frame are mounted counter-shafts $E''$, carrying pulleys $E'$ $E^2$, the pulleys $E'$ being of like diameter, while the intermediate pulleys $E^2$ are of smaller diameter. These pulleys $E'$ $E^2$ are connected by loose belts G $G'$ $G^2$ with opposed pulleys H $H'$ $H^2$, secured rigidly to the power-axle D, the pulleys $H^2$ being of comparatively larger diameter, the pulleys $H'$ of less diameter, and the pulleys H of still smaller diameter. The belts $G'$ are cross-belts. All the belts run loosely without transmitting power until brought into actual service by belt-tightening pulleys I I' I², one for each of the belts G G' G². These belt-tightening pulleys I I' I² are carried by bell-crank levers J J' J², connected by rods $j$ $j'$ $j^2$ with bell-crank levers K K' K², pivotally supported indirectly by the frame. These secondary bell-crank levers K K' K² are in turn connected by rods $k$ $k'$ $k^2$ with the levers L L' L², which are provided with ratchet-levers for holding them in any desired position. A set of these levers and connection is provided for the corresponding belts on each side of the frame, those for the left side being attached to sleeves $l$ $l'$ $l^2$, so that the levers may be grouped at the right-hand side of the carriage.

Sprocket-wheels N upon the outer ends of the counter-shafts E'' are connected by sprocket-chains $n$ with sprocket-wheels $q$, secured to the hub $q'$ of the driving-wheels Q, which turn loosely upon the axle D. Thus power transmitted through the cranks $d$ to the shaft D may be conveyed indirectly to the driving-wheels Q through the medium of the counter-shaft E'' and sprocket-wheels N when the belts are brought into play. For instance, if it is desired to run the carriage at a moderate speed the belts G are tightened by the depression of the tightening-rollers I through the medium of the hand-lever L and connections, and since the pulleys E' are of larger diameter than the pulleys H the motion will be comparatively slow, but the power or leverage comparatively great. If greater speed is desired, the belts G' are released and the tightening-pulleys I² depressed against the belt G², when, the pulleys H² being of larger diameter than the pulleys E², the speed will be correspondingly increased. If it is desired to reverse the direction of motion, the cross-belts G' are depressed by the tightening-pulleys I', the other belts being released. It will be seen that by this arrangement the leverage or power, as well as speed, can be varied to suit the various requirements of use.

The drive-wheels Q are of special construction, being made in two detachable sections bolted together, each section carrying a certain number of spokes, which are arranged so as to leave a central space between them, in which are situated the fly-wheels W, secured rigidly to the driving-shaft D. By placing the fly-wheels W in the interior of the driving-wheels I am enabled to use comparatively large fly-wheels without inconvenience or danger, thus attaining a practical advantage in actual use.

What I claim as my invention, and desire to secure by Letters Patent, is—

1. In a motor-carriage the combination of the duplex motor secured to the front axle, the driving-axle operated by said motor, pulleys of different diameters secured rigidly to said driving-shaft, belts for connecting said pulleys with pulleys of different diameters rigidly secured to a counter-shaft, said counter-shaft, means for transmitting power therefrom to a driving-wheel turning loosely upon the power-shaft, and means for throwing said belts into action independently, substantially as set forth.

2. In a motor-carriage the combination of the duplex motor secured to the front axle, the driving-axle operated by said motor, two drive-wheels mounted loosely upon opposite ends of said driving-shaft, two sets of pulleys of different diameters secured rigidly to said driving-shaft, two counter-shafts situated on opposite sides of the motor and provided with corresponding pulleys of different diameter, belts connecting the opposed pulleys on the driving-shaft with those upon the counter-shafts, means for transmitting power from said counter-shafts to their respective drive-wheels, and means for throwing said belts into action independently, substantially as set forth.

FEODOR C. HIRSCH.

Witnesses:
D. W. GARDNER,
GEO. WM. MIATT.